United States Patent [19]

Altenpohl

[11] 4,439,892

[45] Apr. 3, 1984

[54] SEVERED POULTRY NECK SELECTION SYSTEM

[75] Inventor: Paul J. Altenpohl, High Point, N.C.

[73] Assignee: W. F. Altenpohl, Inc., High Point, N.C.

[21] Appl. No.: 351,351

[22] Filed: Feb. 23, 1982

[51] Int. Cl.³ .............................................. A22C 21/00
[52] U.S. Cl. ............................................ 17/52; 17/11; 209/655; 209/592; 209/932
[58] Field of Search ............... 209/592, 655, 906, 932; 17/11, 12, 52, 45

[56] References Cited

U.S. PATENT DOCUMENTS

| | | | |
|---|---|---|---|
| 2,003,722 | 6/1935 | Powell | 209/655 X |
| 2,323,023 | 6/1943 | Flanagan et al. | 209/655 X |
| 2,926,383 | 3/1960 | Steck | 17/12 X |
| 3,603,458 | 9/1971 | Bliss | 209/655 X |
| 3,859,522 | 1/1975 | Cuthbert | 209/906 X |
| 3,944,078 | 3/1976 | Altenpohl | 209/592 X |
| 4,148,397 | 4/1979 | Altenpohl et al. | 209/592 X |

Primary Examiner—Willie G. Abercrombie
Attorney, Agent, or Firm—Harvey B. Jacobson

[57] ABSTRACT

Poultry necks severed from poultry bodies during production line processing are gravitationally conveyed across a load platform of a weighing device to detect and direct heavier necks along a separate path for subsequent reassembly with poultry bodies. The load platform in its unloaded position is coplanar with an inclined slide surface onto which the severed necks are dropped from the neck cutter. A weight limit above which the heavier necks are detected is established to control the proportion of heavier necks selected for reassembly.

7 Claims, 6 Drawing Figures

SEVERED POULTRY NECK SELECTION SYSTEM

BACKGROUND OF THE INVENTION

This invention relates in general to production line handling of objects such as poultry. More particularly, the invention pertains to the handling of severed poultry necks or the like in a poultry processing system.

Production line processing and packaging of poultry products for consumer marketing in accordance with current practice, involves the conveyance of leg-suspended poultry to a cutter at which poultry necks are severed from eviscerated poultry bodies. After chilling of the bodies and severed necks, some of the necks are reassembled with the bodies at a stuffing station. At the stuffing station, wrapped necks as well as livers and giblets are often placed in cavities of poultry bodies prior to packaging. Some of the severed necks, on the other hand, are deboned and the meat thereof sold separately as a poultry by-product.

The proportion of severed necks reassembled with the poultry bodies depends on product demands or requirements, such as the relative number of orders for whole poultry, cut-up poultry parts, by-products, etc. The selection of the severed necks for reassembly with poultry bodies which are sold at a higher price per pound, or for separate processing as by-products sold at a lower price per pound, is presently accomplished in a random or somewhat haphazard fashion. The relatively low selling price per pound of the poultry necks and the relatively small weight range associated therewith may account for such random selection. For example, the weight of chicken necks generally varies between 40 grams and 110 grams, with an average weight of 70 grams. Nevertheless, with high production line processing of large quantities of poultry, a more judicious selection of severed necks for reassembly with poultry bodies could result in a significant improvement in profits if such selection were efficiently handled in the product line operation of a poultry processing plant.

It is therefore an important objective of the present invention to provide for the efficient and judicious selection of severed portions of objects such as poultry necks for reassembly with poultry bodies in a production line installation such as a poultry processing plant.

SUMMARY OF THE INVENTION

In accordance with the present invention, severed poultry necks are selected for stuffing in poultry bodies by establishing an intermediate weight limit within the weight range of such necks, and providing a weighing device to detect the heavier necks that are above the intermediate weight limit during travel along a gravitational slide path. A directional change in the slide path is effected in response to a detection signal from the weighing device in order to direct the severed necks either to a stuffing station for reassembly with poultry bodies or to a de-boning station for by-product processing.

According to one embodiment of the invention, a gravitational slide path is established by a fixed, inclined slide surface and the load platform of the weighing device. The load platform in its unloaded position is substantially coplanar with the slide surface and movable under a poultry neck load above the established weight limit to produce the detection signal through the weighing device. Poultry necks dropped onto the inclined slide surface adjacent its upper end descend under gravitational force along the slide path which includes the load platform at the lower end of the fixed slide surface, and a pivotally movable slide chute located below the load platform. A power operated cylinder device displaces the slide chute from one position to another in response to the detection signal to thereby effect a directional change in travel of the severed necks to one of two receiver locations from which the severed necks proceed either toward the stuffing station or to a by-product processing station. The detection signal in the illustrated embodiment is generated through a fluidic sensor and fed by a fluidic amplifier to a fluidic valve, controlling operation of the power operated device. Means to insure full stroke operation of the power operated device is associated with the fluidic valve in view of the short duration of the detection signal.

Also associated with the sensor is a counter pulsed by the detection signal to indicate, for example, the number of heavier necks above an average weight directed to the stuffing station. According to another embodiment of the invention, the counter may provide an input to a computer or control logic through which an adjusting mechanism may vary the weight limit above which the weighing device produces the detection signal. Inputs to the control logic representing production rate and readout from a ratio memory cause a change in the weight limit necessary to maintain a substantially constant desired proportion or ratio of heavy poultry necks to poultry bodies being processed, despite the variables involved.

In order to obtain reliable detection and selection of heavier severed necks for reassembly in the poultry bodies, a fluid film coating is established on the slide path to reduce its coefficient of friction. Toward that end, a spray of water is directed onto the slide surface according to one disclosed embodiment. The descent of single necks along the slide path for individual weight limit sensing is thereby assured above a minimum time spacing between neck drops from the neck severing cutter. The production rate or poultry conveyor speed may also be maximized as a result of such measure.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWING FIGURES

DETAILED DESCRIPTION OF PREFERRED EMBODIMENTS

Figure 1:
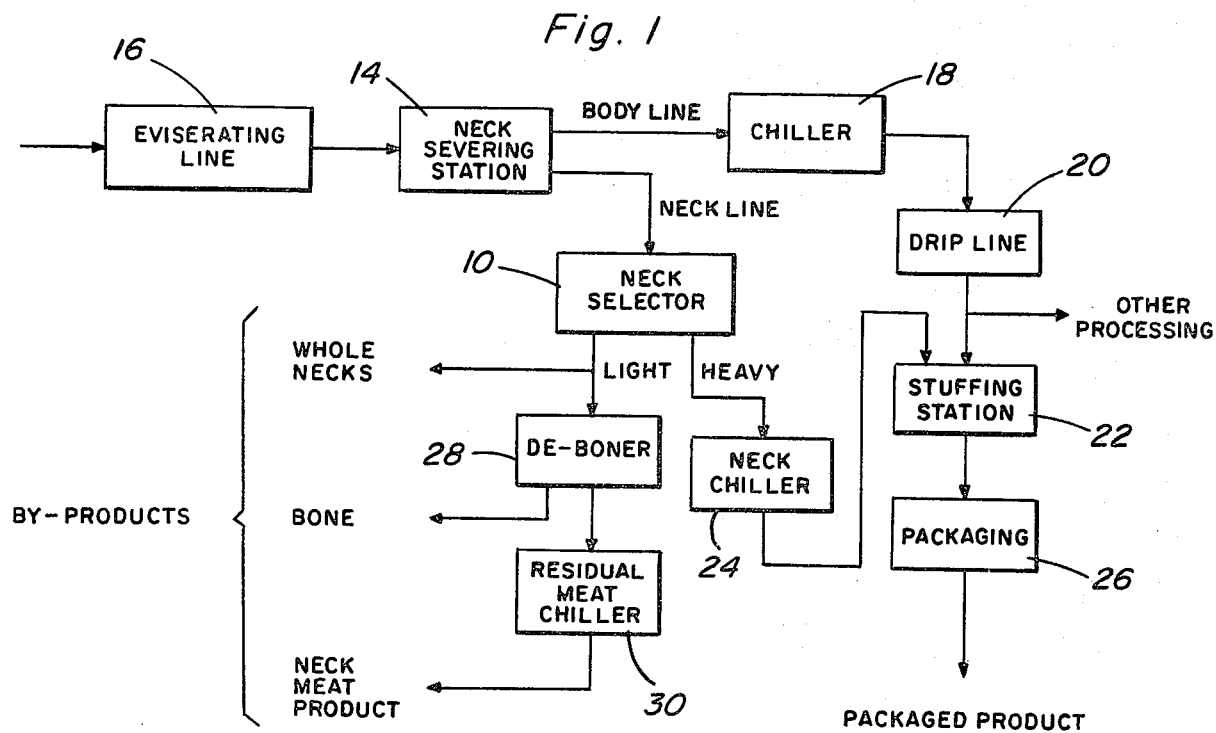
FIG. 1 is a block flow diagram illustrating a production line poultry processing system with which the present invention is associated.

Referring now to the drawings in detail, FIG. 1 schematically illustrates part of the production line in a poultry processing plant, modified by the inclusion of a weight distribution selector component 10 to which severed poultry necks are delivered along line 12 from a neck severing station 14. Eviscerated poultry is fed to such neck severing station by an eviscerating conveyor line 16. The poultry bodies, after leaving station 14, are conveyed along a conveyor path through a chiller 18 and a drip line 20 to a stuffing station 22 or to other processing stations. The stuffing station also receives severed necks traveling along a separate path from a chiller 24. Such chilled necks are reassembled with or stuffed into the cavities of the poultry bodies with other parts such as livers, giblets, etc., for packaging at station 26 as whole poultry products in accordance with practices already well known in the art. The other processing stations aforementioned to which poultry bodies are delivered from drip line 20, involve for example the packaging of separate poultry parts such as breasts and legs in accordance with customer demands.

In accordance with the present invention, the neck distributing selector 10 automatically separates heavier necks from the lighter necks for travel to the neck chiller 24 along the aforesaid separate path and ultimate reassembly at the stuffing station 22. The lighter necks emerging from the selector 10 are separately processed along yet another separate path as by-products such as whole necks, bones, and residual neck meat. Thus, some of the lighter necks are deboned at station 28 and the residual meat chilled at station 30 along the other separate path as shown.

Figure 2:
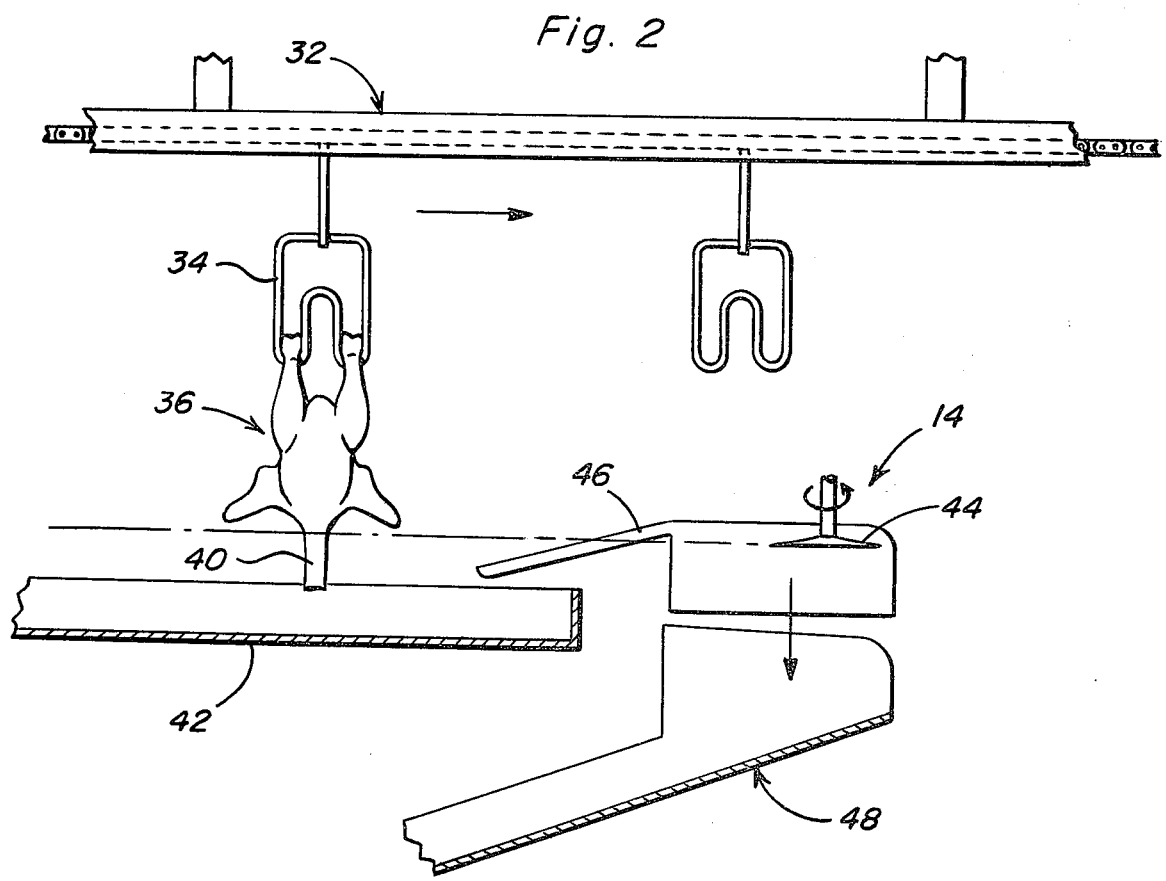
FIG. 2 is a simplified side view illustrating the neck severing operation in the system in relation to the severed neck selection operation of the present invention.

FIG. 2 illustrates the overhead eviscerating conveyor 32 from which shackles 34 suspend poultry bodies 36 by the legs 38. The poultry necks 40 depend from the bodies 36 closely above a drip pan 42 as the bodies travel toward the rotating cutter 44 at the neck severing station 14. The necks are guided into position for cutting by guide structure 46 at station 14 within which the cutter rotates. Severed necks are accordingly dropped from the cutter at station 14 as shown, as the conveyor 32 carries the rest of the poultry bodies toward the next processing station. The foregoing operation and arrangement at the neck severing station is already well known in the art. However, in accordance with the present invention, the severed necks 40 drop onto an inclined slide assembly 48 as shown in FIG. 2, forming part of the neck selector 10.

Figure 3:
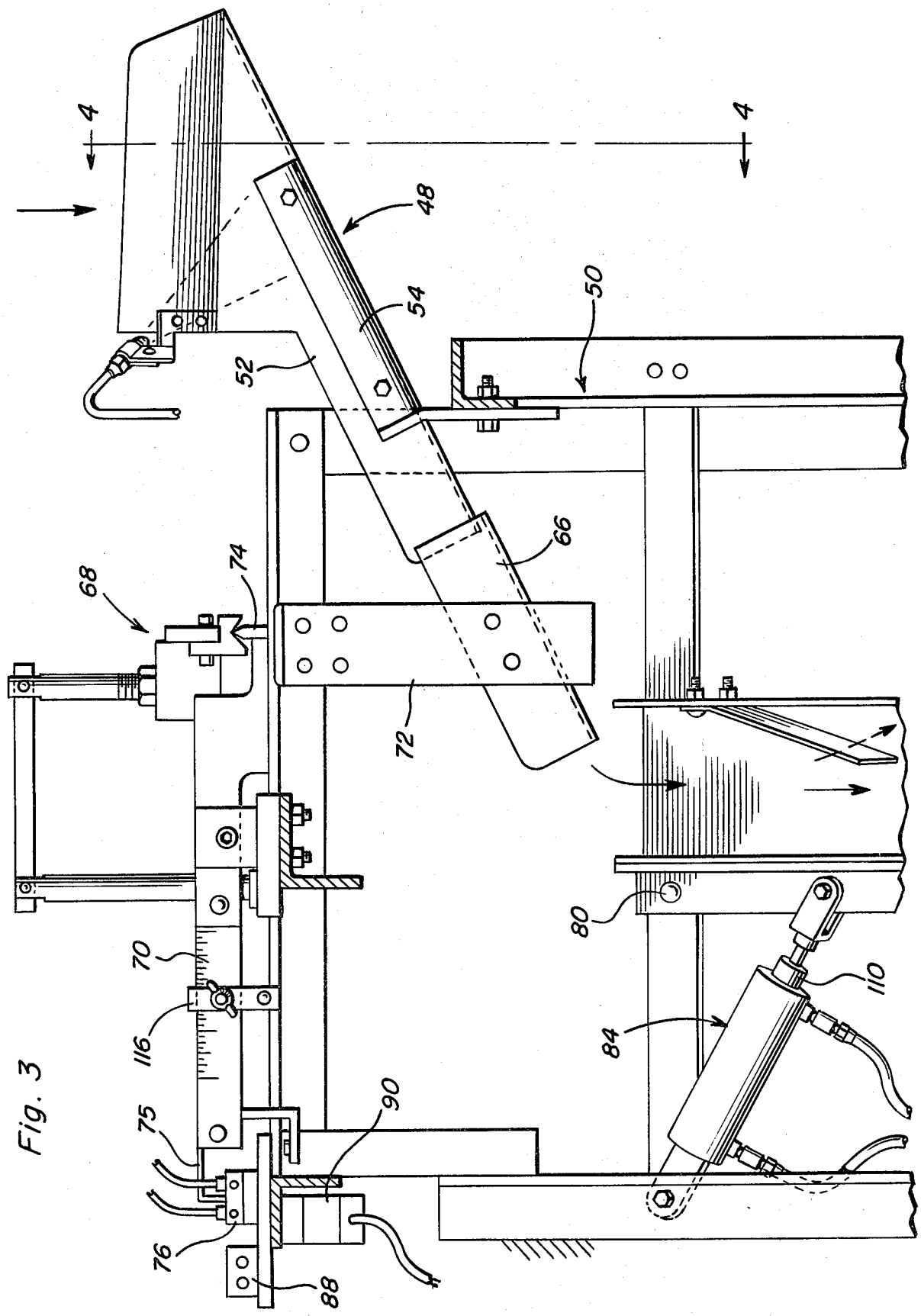
FIG. 3 is a side section view of apparatus for performing the neck selection operation in accordance with one embodiment of the present invention.
Figure 4:
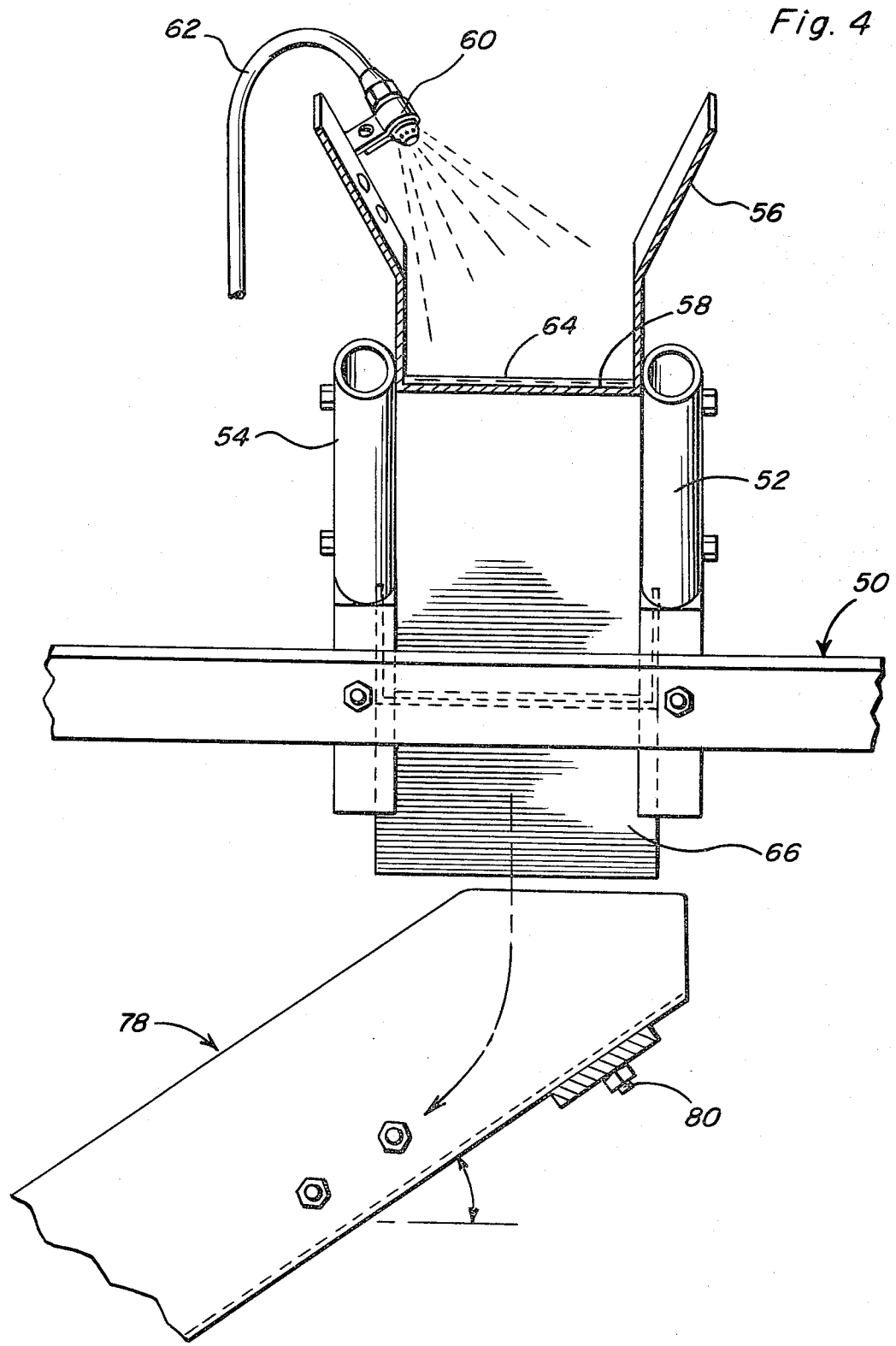
FIG. 4 is a partial transverse section view taken substantially through a plane indicated by section line 4—4 in FIG. 3.

FIGS. 3 and 4 illustrate the neck selector 10 in accordance with a specific embodiment, which includes the inclined slide assembly 48 fixedly mounted by means of any suitable support frame 50 associated with the selector. The slide assembly includes a channel-shaped chute 52 having vertical sides to which mounting bracket members 54 are attached. The bracket members fixedly support the chute 52 on the frame at an incline as shown. The chute has divering side walls 56 attached to its sides adjacent the upper end for reception of the poultry necks dropped from the cutter at the neck severing station. The chute 52 thus establishes a slide path along a fixed slide surface 58 as shown in FIG. 4. A water spraying nozzle mounted on one of the side walls 56 has a water supply conduit 62 connected thereto for establishing a water film 64 on the slide surface. Poultry necks dropped into the chute 52 will therefore descend with minimal frictional restraint onto the load platform 66 associated with a load weighing device generally referred to by reference numeral 68.

The weighing device 68 in the illustrated embodiment is of a type well known in the art for weighing poultry suspended from an overhead conveyor while traveling through a weight sizing station. Such weighing device includes a scale beam 70 fulcrumed on the frame intermediate the ends thereof, with one end loaded through the platform 66, a platform suspending frame 72 and a load transfer element 74. The other end of the scale beam has an element 75 attached thereto as shown in FIG. 3 associated with a fluidic sensor 76. The sensor 76 is also well known in the art and generates a fluidic detection signal when a load above a predetermined weight limit moves onto the load platform 66. In response to such loading, the platform moves downwardly by a limited amount from an unloaded position in which it is substantially coplanar with the inclined slide surface of chute 52 in accordance with the present invention.

The slide path established by the chute 52 and load platform 66 is extended by a delivery chute 78 that is pivotally mounted on the frame at pivot 80. In the position of chute 78 as shown in FIG. 3, poultry necks dropping off the load platform 66 will be directed in one direction shown by solid line arrow 82 to one of two receiver locations for the lighter necks. In response to a detection signal from the sensor 76, the chute 78 is pivoted to its other position by a fluid powered cylinder device 84 thereby directing a heavier neck along the direction denoted by dotted arrow 86 to the other receiver location from which the heavy necks are ultimately delivered to the stuffing station as diagrammed in FIG. 1. A fluidic control valve 88 mounted on the frame responds to the detection signal from sensor 76 to effect the neck selecting operation of cylinder device 84. The detection signals also pulse a counter 90 of any well known and suitable type providing an indication of the number of heavier necks routed toward the stuffing station for reassembly with poultry bodies.

Figure 5:
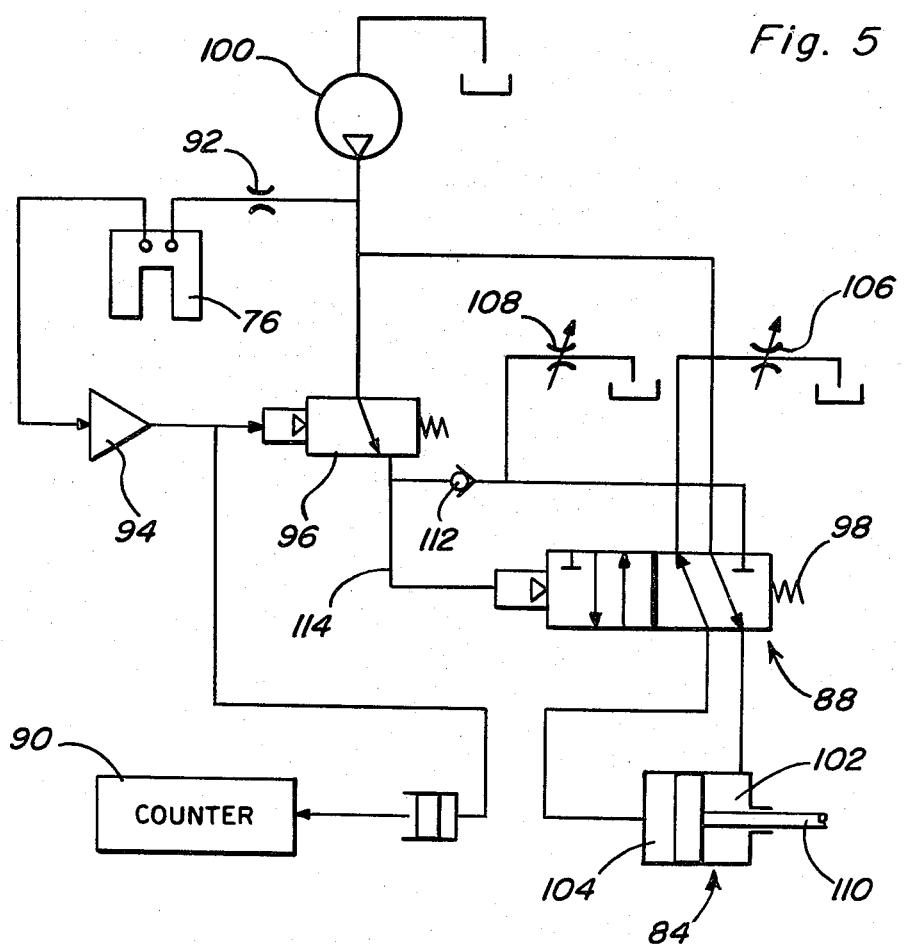
FIG. 5 is a fluid circuit diagram representing some of the components associated with the apparatus shown in FIG. 3.

Control over the operation of cylinder device 84 through control valve 88 will become apparent from the fluid circuit diagram of FIG. 5. Pressurized fluid such as compressed air is fed to sensor 76 through a restrictor 92. A fluidic detection signal generated by the sensor is fed to a fluidic amplifier 94 from which an amplified signal is fed to a pilot valve 96. The pilot valve is operative in response to the amplified detection signal to apply an actuating force to the control valve 88 against the bias of a return spring 98. In the position of valve 88 to which it is biased by spring 98, pressurized fluid from source 100 is directed to one chamber 102 of the cylinder device while the other chamber 104 is vented through an adjustable restrictor 106. The cylinder device is accordingly held in its retracted position in the absence of any detection signal. When a detection signal is generated, the valve 88 is actuated to its other operative position in which chamber 104 is pressurized and chamber 102 is vented through another adjustable restrictor 108. Thus, when valve 88 is actuated, the cylinder device 84 is extended to displace its piston rod 110 and the pivoted chute 78 attached thereto. Also, when the chamber 104 is pressurized, the counter 90 is simultaneously pulsed.

In order to insure that the cylinder device is extended through a full stroke despite a detection signal of short duration, a one-way check valve 112 interconnects one of the exhaust ports of valve 88, through which chamber 102 is vented, to the pilot valve actuating pressure line 114. Fluid displaced from chamber 102 during signal-induced pressurization of chamber 104 is conducted to line 114 through check valve 112 to prolong pressurization of line 114 and thereby hold the valve 88 in its actuated position for a sufficient length of time to complete the transfer of each heavy neck along the path direction indicated by arrow 86 in FIG. 3.

Figure 6:
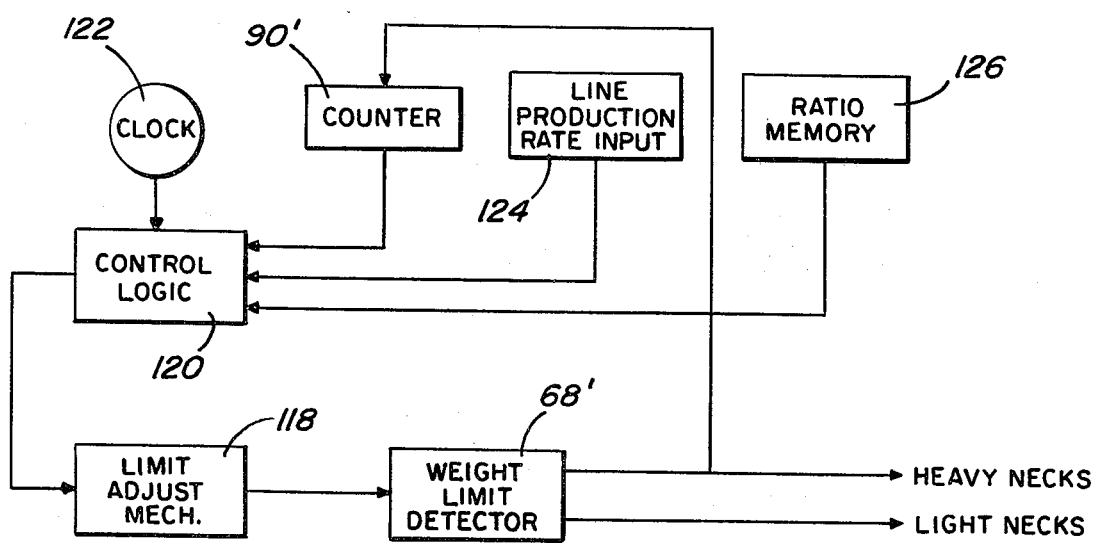
FIG. 6 is a block diagram illustrating control means that may be associated with the system depicted in FIG. 1.

It will be noted from FIG. 3 that the scale beam 70 has an adjustably positioned counterweight 116 through which the weight limit at which the weighing device 68 produces a detection signal, may be adjusted for any desired value such as an average weight limit of 70 grams for a neck weight range of 40 to 110 grams. In such case, the proportion of heavy necks above 70 grams to light necks below 70 grams will vary. It will be appreciated that the separation of a substantially constant proportion of heavy to light necks may be effected through the selector 10 by changing the weight limit as a function of the variation in weight distribution of severed necks with the associated weight range. Toward that end, a somewhat different type of weighting device or weight limit detector 68' would be utilized as diagrammed in FIG. 6, capable of being readily adjusted through a limit adjusting mechanism 118. Detection of heavy loads by detector 68' pulses a counter 90' from which one input is obtained for a computer or control logic 120 automatically effecting a change in the weight limit through mechanism 118. A clock 122 feeds a timing signal to the logic while an input is obtained from a production rate monitoring component 124 since the frequency of the detection signal pulses counted will depend on the production rate as well as the variable weight distribution of the neck loads within its weight range. Appropriate programming of the control logic to obtain the constant ratio of desired value is effected through a ratio memory component 126.

The foregoing is considered as illustrative only of the principles of the invention. Further, since numerous modifications and changes will readily occur to those skilled in the art, it is not descired to limit the invention to the exact construction and operation shown and described, and accordingly, all suitable modifications and equivalents may be resorted to, falling within the scope of the invention.

What is claimed as new is as follows:

1. In a product processing and packaging system having means for severing portions of objects during travel and sorting means for separation of selected ones of the severed portions of the objects substantially deviating in one direction from a predetermined weight limit, the improvement comprising means responsive to said separation of the selected severed portions for reassembly thereof with some of the objects prior to packaging, and means for processing the other of the severed portions separately from the reassembled severed portions.

2. The combination of claim 1 wherein said objects are poultry and the severed portions are poultry necks.

3. The improvement as defined in claim 2 wherein said predetermined weight limit is an average weight of the poultry necks.

4. The combination of claim 1 wherein said improvement further includes means for counting the reassembled severed portions, and means operatively connected to the counting means for varying the predetermined weight limit of the sorting means to maintain a substantially constant ratio of the reassembled severed portions to objects.

5. In a production line poultry processing system wherein a cutter severs necks of poultry bodies suspended in spaced relation from a conveyor moving the poultry along a conveyor path to a packaging station, the method including the steps of: separating heavier severed necks from lighter severed necks during descent from the cutter; establishing a weight limit between the heavier and lighter necks to control the proportion of heavier to lighter necks being separated; conveying the heavier necks along a travel path separate from the conveyor path to the poultry bodies during travel along the conveyor path; and reassembling the heavier necks with the poultry bodies prior to reaching the packaging station.

6. In combination with a conveyor establishing a conveyor path along which objects travel, automatic sorting apparatus, and means for severing portions of the objects during continued travel of the objects along the conveyor path, the improvement comprising means for establishing additional travel paths separate from the conveyor path along which the severed portions travel, means connected to the automatic sorting apparatus for distributing the severed portions according to weight between said additional travel paths, and means for reassembling the severed portions traveling along one of the additional travel paths with the objects during said continued travel along the conveyor path.

7. The improvement as defined in claim 6 including means for varying the distribution according to weight between said additional travel paths, and logic means controlling the variation in distribution for maintaining a substantially constant ratio of severed portions traveling along said one of the additional paths to objects being severed.

* * * * *